United States Patent [19]
Christophe et al.

[11] Patent Number: 5,674,392
[45] Date of Patent: Oct. 7, 1997

[54] TREATMENT ASSEMBLY FOR TREATING A FLUID BY FILTERING AND CENTRIFUGING

[75] Inventors: Théophile Christophe, Fontenay le Fleury; Jean-Claude Moatti, Suresnes, both of France

[73] Assignee: Moatti Filtration S.A., Sous Bois, France

[21] Appl. No.: 581,547

[22] PCT Filed: Oct. 19, 1995

[86] PCT No.: PCT/FR95/01382

§ 371 Date: Sep. 3, 1996

§ 102(e) Date: Sep. 3, 1996

[87] PCT Pub. No.: WO96/12549

PCT Pub. Date: May 2, 1996

[30] Foreign Application Priority Data

Oct. 19, 1994 [FR] France ................. 94 12461

[51] Int. Cl.$^6$ ................. C02F 9/00; B01D 36/00; B04B 9/06
[52] U.S. Cl. ................. 210/298; 210/308; 210/259; 210/262; 210/411; 210/415; 494/36; 494/49; 494/65
[58] Field of Search ................. 210/168, 298, 210/307, 308, 259, 260, 261, 262, 411, 413, 415; 494/36, 49, 65

[56] References Cited

U.S. PATENT DOCUMENTS

| | | |
|---|---|---|
| 2,750,107 | 6/1956 | More . |
| 2,792,172 | 5/1957 | Tait . |
| 3,231,182 | 1/1966 | Downey . |
| 3,432,091 | 3/1969 | Beazley . |
| 3,599,792 | 8/1971 | Stripp . |
| 3,944,488 | 3/1976 | Moatti . |
| 4,221,323 | 9/1980 | Courtot . |
| 4,557,831 | 12/1985 | Lindsay . |
| 4,615,315 | 10/1986 | Graham . |
| 4,640,772 | 2/1987 | Graham . |
| 4,787,975 | 11/1988 | Purvey . |

FOREIGN PATENT DOCUMENTS

| | | |
|---|---|---|
| 0108665 | 5/1984 | European Pat. Off. . |
| 0136202 | 4/1985 | European Pat. Off. . |
| 4306431 | 7/1994 | Germany . |
| 563191 | 6/1977 | U.S.S.R. . |
| 636032 | 12/1978 | U.S.S.R. . |
| 854454 | 8/1981 | U.S.S.R. . |
| 1091946 | 5/1984 | U.S.S.R. . |
| 1416189 | 8/1988 | U.S.S.R. . |
| 1613175 | 12/1990 | U.S.S.R. . |
| 876299 | 8/1961 | United Kingdom . |
| 2113122 | 8/1983 | United Kingdom . |
| 2160796 | 1/1986 | United Kingdom . |

*Primary Examiner*—Thomas M. Lithgow
*Attorney, Agent, or Firm*—Oppenheimer Poms Smith

[57] ABSTRACT

The invention relates to a fluid treatment assembly comprising a filter (4) which itself comprises filtering elements (5) and a cleaning device (12) for periodically cleaning each filtering element including a conduit (17) for the evacuation of the cleaning fluid filled with impurities resulting from the cleaning, the treament assembly further comprising a centrifuging device which itself comprises a rotary enclosure (37) connected to a fluid admission conduit (28).

According to the invention, the filtering elements (5) and the enclosure (37) are contained in a single casing (1A–1B), while the admission conduit (28) is directly connected (29–30) to the conduit (17) for evacuating the cleaning fluid.

The invention finds an application in the construction of a compact and reliable assembly.

17 Claims, 2 Drawing Sheets

TREATMENT ASSEMBLY FOR TREATING A FLUID BY FILTERING AND CENTRIFUGING

TECHNICAL FIELD

A fluid treatment assembly is already known, which assembly comprises, on the one hand, a filter constituted of at least one filtering element, and on the other hand, a centrifuging device which device comprises a rotary centrifuging enclosure provided with an admission conduit.

In this known treatment assembly, the centrifuging treatment device is separated from the filter and is connected therewith via conduits external to each of said two treatment and filtering devices.

Such a treatment assembly is bulky, its cost price is high and it is subject to accidents, particularly where the external connection conduits are concerned. Moreover, the filter is generally a filter with disposable filtering elements.

BACKGROUND OF THE INVENTION

It is the object of the present invention to overcome said drawbacks by providing a filter that comprises a device for cleaning each filtering element including a rotary distributor driven by a motor and designed to periodically isolate one part of the filtering surface in order to enable the cleaning thereof with clean fluid flowing backwards through each filtering element and then into the centrifuging device, for purifying same, via an evacuation conduit.

Therefore according to the invention, the filtering element or elements and the centrifuging enclosure are contained in a single casing, while the evacuation conduit for the cleaning fluid filled with impurities issues directly into the admission conduit of the rotary enclosure.

The advantageous following dispositions are also preferably adopted:

one end of one of the evacuation conduits is fitted in one end of the other of said two conduits, while the other end of the admission conduit is fixed on said single casing;

said other end of the admission conduit is fixed to said casing via a bolt which, at the same time, obturates said other end;

the centrifuging enclosure communicates with the inside of the casing via at least one outlet nozzle for the centrifuged fluid, which nozzle is oriented substantially perpendicularly to a radius passing through the axis of rotation of said centrifuging enclosure, in such a way that said centrifuging enclosure is driven in rotation by the reaction of the fluid coming out of said outlet nozzle or nozzles with respect to the fluid contained in the casing;

said evacuation conduit is provided in the rotaty distributor;

receiving chambers for receiving the fluid filtered by the filtering elements of the filter and the fluid treated by the centrifuging treatment device, are provided in said single casing, said chambers being separated one from the other by a fluidtight partition wall.

DISCLOSURE OF INVENTION

The invention offers the following main advantages: compactness of the treatment assembly, reliability of said assembly, and reduced production costs compared with the prior constructions.

BRIEF DESCRIPTION OF THE DRAWINGS

The invention will be more readily understood and secondary characteristics and their advantages will emerge from the following description of one example of embodiment.

It is to be understood that the description and drawings are only given by way of indication and non-restrictively.

Figure 1:
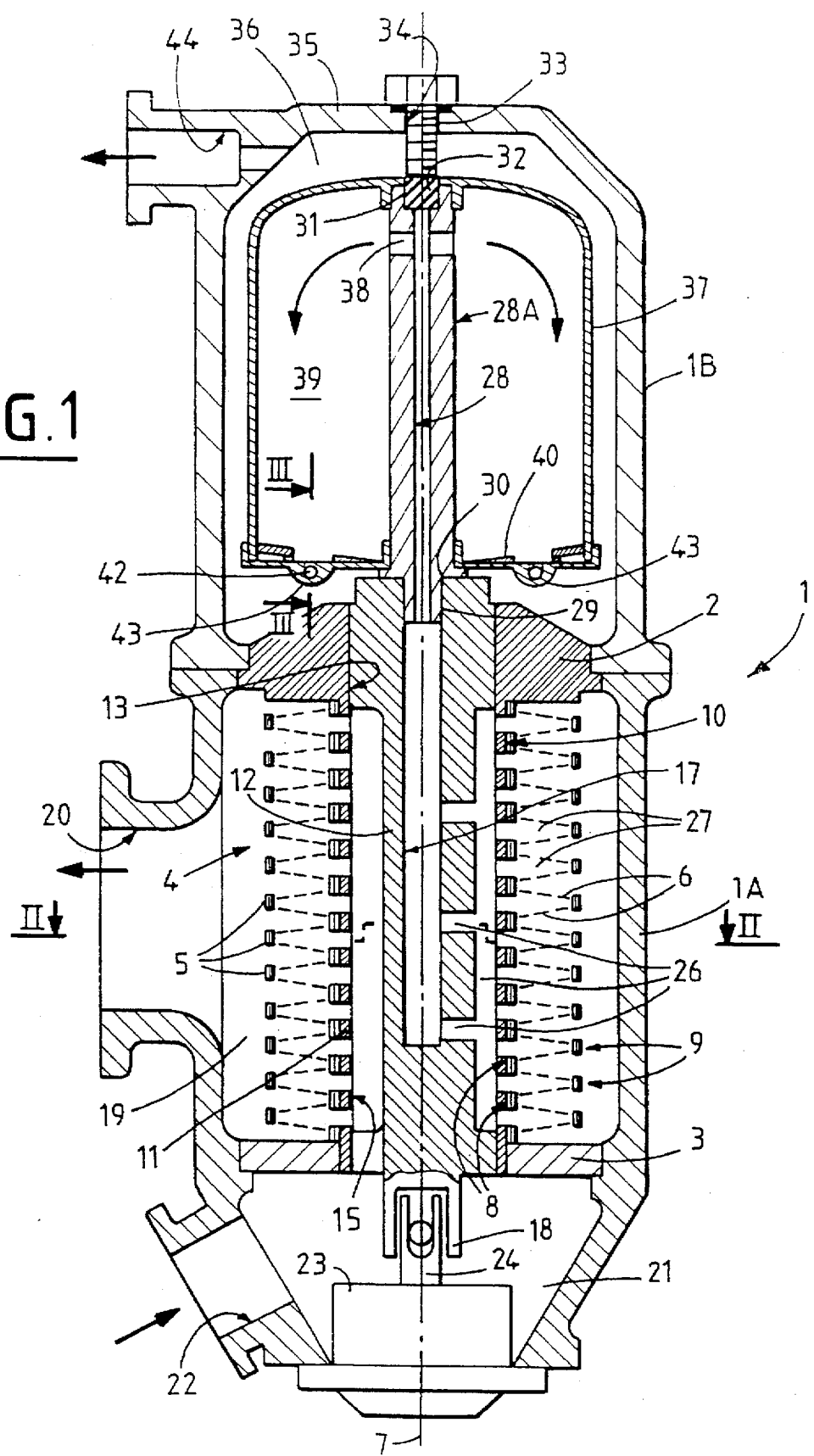
Figure 2:
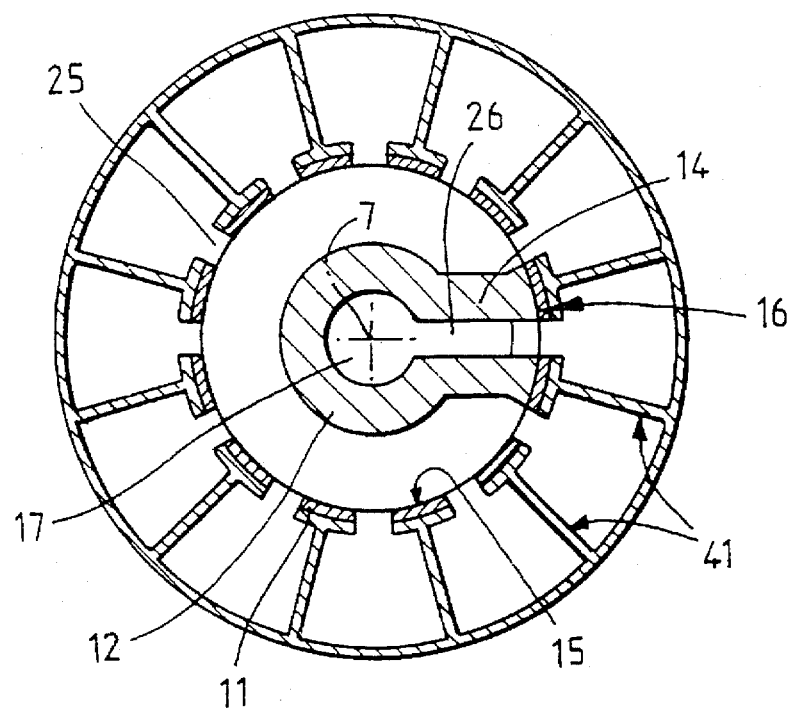

Reference will be made to the accompanying drawings, in which:

FIG. 1 is an axial section of a treatment assembly according to the invention,

FIG. 2 is a section along II—II of FIG. 1, and

Figure 3:
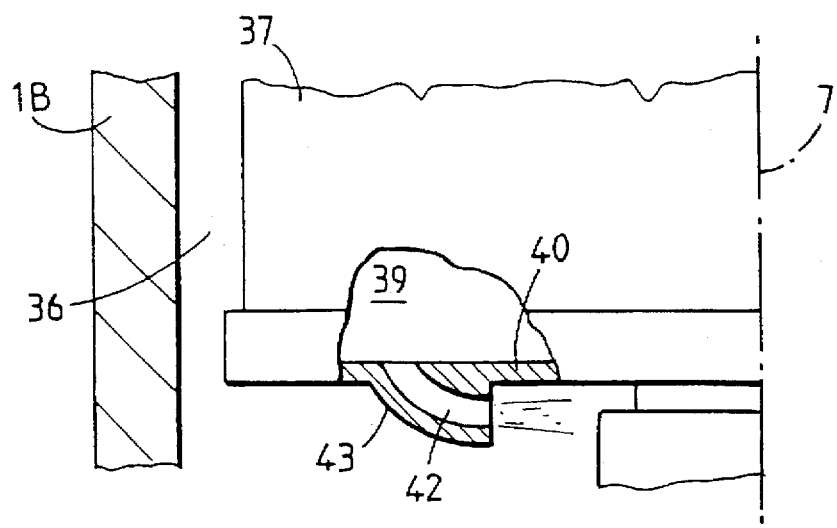

FIG. 3 is a section along III—III of FIG. 1.

DETAILED DESCRIPTION OF THE PREFERRED EMBODIMENTS

The fluid treatment assembly illustrated in the figures comprises a filter and a centrifuging treatment device, both of them being contained in a single casing 1 made up of two parts 1A, 1B, assembled by bolts.

The filter, which is contained in part 1A of the casing, comprises:

two transversal end walls 2, 3 between which is provided a stack 4 of filtering elements 5, each one of which is shaped into a filtering disk 9, with two screens 6;

a central axis 7;

aligned bores 8, having the same diameter, and being coaxial to axis 7, each bore belonging to one of the filtering disks 9, in tight contact with the cylindrical external face 10 of a liner 11, which liner comprises a bore 15 co-axial to the axis 7;

a central fluid distributor 12, mounted for rotation about axis 7, in tight contact with a bore 13 provided in the intermediate wall 2, said wall being itself tightly assembled to pans 1A and 1B of the casing;

a U-section sector 14, provided in the fluid distributor 12, the periphery 16 of which bears tightly against the bore 15 of the liner 11, and which communicates with an evacuation conduit 17 provided in the fluid distributor 12, coaxial to axis 7;

a driving fork 18, situated at the axial end of the fluid distributor 12 opposite the intermediate wall 2;

a receiving chamber for receiving the filtered fluid 19, which chamber is provided inside the part 1A of the casing, contains the stack 4 of filtering elements 5 and is equipped with a connector 20 for the evacuation of the filtered fluid;

an admission chamber 21 for admitting the polluted fluid to be filtered, said chamber being equipped with an admission connector 22 for admitting the fluid to be filtered;

a motor 23, in this particular example, a hydraulic motor, for driving the fluid distributor 12 in rotation, said motor being fixed on the part 1A of the casing and being equipped with a driving member 24 operationally coupled to the fork 18 for driving the fluid distributor 12 in rotation.

Each filtering element 5 comprises a plurality, counting twelve in the embodiment illustrated in FIG. 2, of angular sectors 41 which, through orifices 25 provided in the liner 11 and in the bores 8, are adapted, successively, to create a communication between the inside space 27 defined by the parts of the two screens 6 of the sector considered, and a conduit 26 which is provided in sector 14 of the fluid distributor 12 and which issues into the evacuation conduit 17, which latter is a blind conduit at the end of the fluid distributor 12 facing the wall 2.

The centrifuging treatment device is contained in part 1B of the casing and comprises:

a central admission conduit 28 for admitting the fluid to be centrifuged, of which one end 29 is constituted by an endpiece fitted in the open (non-blind) end 30 of the evacuation conduit 17, while the other end 31 is constituted by a female thread for fixing in an obturating bolt 32; the bolt 32 itself constitutes the end of a plug 33 screwed 34 into a transversal end plate 35 which defines, in part 1B of the casing, a chamber 36 for receiving the centrifuged fluid, which chamber is tightly separated from the chamber 19 receiving the filtered fluid, by the intermediate wall 2;

a centrifuging enclosure 37 is mounted for rotating, via rings forming smooth bearings, about axis 7, which axis 7 is also the axis of the admission conduit 28 and of its external face 28A, said conduit therefore forming also a rotary shaft for the centrifuging enclosure 37;

orifices 38 creating a communication between the admission conduit 28 and the inside 39 of the enclosure 37.

A transversal bottom 40, which is perpendicular to the axis 7, defines the part of the centrifuging enclosure 37 which is placed in facing relationship to the transversal wall 2. Said centrifuging enclosure 37 is totally isolated from the receiving chamber 36 receiving the centrifuged fluid except for the communication created by two outlet nozzles 43, which are substantially diametrically opposite, and whose outlet orifices are directed so as to be substantially perpendicular to a diameter passing through the axis 7, and in two opposite directions.

The treatment assembly works as explained hereinbelow.

The fluid to be treated, which is admitted into the admission chamber fills in the inner spaces 27 of all the sectors of the various filtering elements 5, with the exception of the space inside the sector 41 of each filtering element which is temporarily isolated from the other sectors 41 by the U-section sector 14 which is, itself, in communication with the conduit 26.

This fluid to be filtered, which is contained in said spaces 27, flows through the screens 6 of said sectors, depositing on the inner faces thereof, the impurities that it contains, and being received when cleared of its impurities, into the receiving chamber 19 receiving the filtered fluid which is ready to be used again.

Conversely, as regards the sectors 41 of the various filtering elements which only communicate with the conduit 17, the pressure of the already filtered fluid which is contained in the chamber 19, causes past of said fluid to flow through the corresponding parts of the filtering screens 6, this enabling the impurities which have deposited on the inner faces of the screens to be periodically detached therefrom and to be driven into the evacuation conduit 17. The function of the motor 23 is to drive stepwise, sector 41 by sector 41, the distributor 12 in rotation so as to ensure that each angular sector 41 of the various filtering elements is periodically placed in communication with the evacuation conduit 17.

Said fluid filled with impurities is conveyed directly via the evacuation conduit 17 and the admission conduit 28 towards the centrifuging enclosure 37, where it is received therein 39 and where, by centrifuging, it is cleared of its impurities. The purified fluid is then evacuated out of the enclosure 37 through the nozzles 43 and is received into the chamber 36 wherefrom it is released towards an application unit, via an outlet connector 44 provided in part 1B of the casing.

It should be observed that the rotation of the centrifuging enclosure 37 is induced by the effect of reaction, with respect to the fluid contained in the enclosure 37, of the fluid escaping from the inside 39 of the enclosure 37 through the conduits 42 of the nozzles 43. Said reaction effect is sufficient to drive the centrifuging enclosure in rotation at a rotation speed—of the order of 6000 rpms—at which the centrifuging is effectively performed. As a reminder, the speed of rotation reached by the motor 23 is around 2 to 3 rpms.

The advantage of the described embodiment resides in the compactness and light weight of the assembly; in the elimination of any leaks from the external connections between filter and centrifuging device, due to the elimination of said external connections; in the elimination of any risks of the external conduits breaking up, as these conduits have also been eliminated; and finally, in the obtained reduction of the assembly manufacturing costs.

It is understood that the invention is not limited to the embodiment of filters equipped with disks or pads as filtering elements, but also covers the case of any other filters such as, for example, those having cylindrical screens. The motor 23, which is advantageously a hydraulic type motor, may also, as a variant, be of another type, such as electric. Finally, at least one nozzle 43 should be provided, and preferably an even number of diametrically opposite nozzles.

The invention finds an application in the treatment of lubricating oils for "Diesel" type engines, or even in the purification of certain fuels used by said engines.

The invention is not limited to the described embodiment, and on the contrary covers any variants that can be made thereto without departing from its scope or its spirit.

We claim:

1. A treatment assembly for treating a fluid comprising:
   a filter device having at least one filtering element; said filtering element including an inlet for fluid to be filtered, an outlet for filtered fluid, and a filtering surface;
   a centrifuging device including a rotary enclosure having an admission conduit, an outlet for purified fluid, and means for rotating said rotary enclosure; and
   a cleaning device for cleaning said at least one filtering element, said cleaning device including:
   a motor driven rotary distributor, for periodically isolating one part of the filtering surface in order to allow counter-current cleaning thereof by clean counter-current fluid flowing through said at least one filtering element, the rotary distributor including an evacuation conduit which communicates with said admission conduit for feeding the counter-flow fluid to be purified to the centrifuging device.

2. The treatment assembly of claim 1, wherein:
   the evacuation conduit directly opens out into the admission conduit of the rotary enclosure.

3. The treatment assembly of claim 2, wherein:
   said filter device and said rotary enclosure are contained in a single casing.

4. The treatment assembly of claim 3, wherein:
   the evacuation conduit has a first end and a second end;
   the admission conduit has a first end and a second end;
   the admission conduit first end is fitted in said evacuation conduit first end; and
   the admission conduit second end is fixed to said single casing.

5. The treatment assembly of claim 4, wherein:
   the admission conduit second end is fixed to the casing via a bolt, said bolt obturating the admission conduit second end.

6. A treatment assembly according to claim 3, wherein:

the rotary enclosure communicates with an inside of said casing via at least one outlet nozzle through which centrifuged purified fluid passes, said nozzle being oriented substantially perpendicularly to a radius passing through an axis of rotation of the rotary enclosure, in such a way that the rotary enclosure is driven in rotation by a reaction of the centrifuged fluid coming out of the nozzle with respect to fluid contained in the casing.

7. A treatment assembly according to claim 1, wherein:

the evacuation conduit is provided in the rotary distributor.

8. A treatment assembly according to claim 7, wherein:

receiving chambers for receiving fluid filtered by said filtering elements of said filter and fluid treated by said centrifuging device are provided in said single casing, said chambers being separated one from the other by a fluidtight partition wall.

9. A treatment assembly according to claim 7, wherein:

the evacuation conduit is coaxial with an axis about which the rotary distributor rotates.

10. A treatment assembly according to claim 1, wherein:

receiving chambers for receiving fluid filtered by said filtering elements of said filter and fluid treated by said centrifuging device are provided in said single casing, said chambers being separated one from the other by a fluidtight partition wall.

11. A fluid treatment assembly comprising:

casing means having a fluid to be filtered inlet, a filtered fluid outlet, and a centrifuged fluid outlet said inlet and said fluid outlet defining, in part, a first internal fluid path therebetween and said inlet and said centrifuged fluid outlet defining, in part, a second internal fluid path therebetween;

centrifuging means mounted rotatably in said second fluid path for centrifuging a counter current fluid having filtered impurities therein and for discharging the centrifuged counter current fluid to said centrifuged fluid outlet;

filter means having a filtering surface for filtering impurities from said fluid to be filtered as it travels along said first internal fluid path and for temporarily accumulating on said filtering surface the impurities removed from the fluid to be filtered; and rotatable distributor means mounted to said filter means for periodically isolating said filtering surface from said first internal fluid path to permit a counter flow of filtered fluid to pass through said filtering surface to carry the filtered impurities along said second internal fluid path to said centrifuging means;

said first internal fluid path and said second internal path being sufficiently isolated from one another by said rotatable distributor means to substantially prevent fluid leakage from said centrifuging means to said filter means as said fluid to be filtered travels along said first fluid path.

12. A fluid treatment assembly according to claim 11, further comprising evacuation means mounted axially within said casing means for defining an isolated fluid path extending axially between said filter means and said centrifuging means to permit said counterflow of filtered fluid to pass to said centrifuging means without leakage to said filtered fluid outlet.

13. A fluid treatment assembly according to claim 12, wherein said evacuation means is an internal evacuation conduit.

14. A fluid treatment assembly according to claim 13, wherein said centrifuging means includes a centrifuging enclosure in fluid communication with said evacuation conduit;

said centrifuging enclosure including nozzle means for discharging the centrifuged fluid toward said centrifuged fluid outlet and for causing said centrifuge enclosure to rotate about its longitudinal axis at a rapid rotational speed.

15. A fluid treatment assembly according to claim 14, wherein said rapid rotational speed is abut 6000 revolutions per minute.

16. A fluid treatment assembly according to claim 15, wherein said rotatable distributor means includes motor means coupled to said filter means for rotating it at a slow rotational speed.

17. A fluid treatment center according to claim 16, wherein said slow rotational speed is between about 2 revolutions per minute and about 3 revolutions per minute.

* * * * *